United States Patent
Lan et al.

(10) Patent No.: US 11,877,221 B1
(45) Date of Patent: Jan. 16, 2024

(54) UNCERTAINTY BASED ALTITUDE FILTERING FOR LOCATION REPORTING IN E911 SYSTEMS

(71) Applicant: T-Mobile Innovations LLC, Overland Park, KS (US)

(72) Inventors: Wei-Ming Lan, Morrisville, NC (US); Nan Xiao, Mercer Island, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 175 days.

(21) Appl. No.: 17/491,047

(22) Filed: Sep. 30, 2021

(51) Int. Cl.
| | |
|---|---|
| *H04W 4/90* | (2018.01) |
| *H04W 4/029* | (2018.01) |
| *H04W 64/00* | (2009.01) |
| *H04M 3/51* | (2006.01) |
| *H04W 76/50* | (2018.01) |

(52) U.S. Cl.
CPC .............. *H04W 4/90* (2018.02); *H04W 4/029* (2018.02); *H04W 64/003* (2013.01); *H04M 3/5116* (2013.01); *H04W 76/50* (2018.02)

(58) Field of Classification Search
CPC ..... H04W 4/90; H04W 4/029; H04W 64/003; H04W 76/50; H04M 3/5116
See application file for complete search history.

(56) References Cited

U.S. PATENT DOCUMENTS

| | | | | | |
|---|---|---|---|---|---|
| 2012/0113837 | A1* | 5/2012 | Siomina | ................ | H04W 24/10 370/252 |
| 2015/0309183 | A1* | 10/2015 | Black | .................... | G01S 19/396 342/357.25 |
| 2016/0102995 | A1* | 4/2016 | Gum | ..................... | H04W 4/029 702/98 |
| 2016/0234644 | A1* | 8/2016 | Belghoul | .............. | G01S 5/0236 |
| 2019/0253861 | A1* | 8/2019 | Horelik | ................. | H04W 76/50 |

* cited by examiner

*Primary Examiner* — Minjung Kim
(74) *Attorney, Agent, or Firm* — SHOOK, HARDY & BACON L.L.P.

(57) ABSTRACT

Systems, methods, and computer-readable media herein generate an E911 location report based on an altitude or an altitude uncertainty associated with an estimated location received from a UE device. The altitude and altitude uncertainty may be compared to determined thresholds to determine which portions of the estimated location to include in an E911 location report sent to a PSAP. A location report generated to include the location information that is based on evaluating the altitude and altitude uncertainty can be sent to a PSAP, thus providing the most relevant and accurate information so that first responders can more effectively locate a distressed caller.

20 Claims, 7 Drawing Sheets

UNCERTAINTY BASED ALTITUDE FILTERING FOR LOCATION REPORTING IN E911 SYSTEMS

BACKGROUND

Enhanced 911 ("E911") is a vital part of the emergency response system. Upon a distressed caller placing an emergency call via user equipment ("UE"), E911 is able to critically provide the estimated physical location of the caller. This physical location is often provided to a Public Safety Answering Point ("PSAP"), such as an operator who receives 911 calls and dispatches first responders to the scene. E911 is in contrast to traditional 911 services where a caller has to orally provide the operator with location information. In E911, various types of positioning technologies can be used to derive geographical location information for a UE, which can then be provided to a PSAP. For example, location information for a UE can be provided in the form of a Device Based Hybrid ("DBH") location and/or an Assisted Global Positioning System ("A-GPS") location. DBH is a positioning solution that uses a combination of technologies, such as satellite Global Positioning System ("GPS") and crowd-sourced Wi-Fi measurements to produce high-accuracy location information. This technology is particularly suited for UEs located indoors. A-GPS is a positioning technology that uses a global navigation satellite system to determine an estimated position of a device. The A-GPS system assists in determining a position fix for a device based on using one or more data networks to provide the orbital information associated with the global positioning satellites. Since the A-GPS system uses a data network to determine orbital information associated with one or more global positioning satellites—instead of acquiring the information from the satellites directly from the satellites—A-GPS enables improved performance and a reduced duration for determining a device's position compared to a stand-alone GPS system.

An uncertainty value may be associated with location information generated using positioning technologies. An uncertainty value represents an estimate of the amount of potential positional error associated with an estimated location or coordinates. In particular, the location information generated using positioning technologies may include an uncertainty value associated with an altitude component (e.g., a vertical uncertainty) of a location. An altitude uncertainty is a location parameter that may indicate the outer boundary of an altitude range of a search area surrounding the estimated location for a UE, such as the estimated altitude coordinates obtained from an estimated location. Altitude uncertainty may be a distance or altitude that is expressed in meters, or any other suitable unit. In some embodiments, a lower altitude uncertainty value, indicates a smaller potential search area and a higher likelihood that a caller will be located.

In conventional E911 methods and systems, if transmission of a UE's location to a cellular network is successful, the location is used in generating a location report for the UE that is sent to a PSAP. In some scenarios, an estimated location derived using technologies such as DBH and/or A-GPS associated with a UE may be transmitted as part of the location report. The inclusion of these estimated locations may provide an enhanced ability to locate a distressed caller associated with the UE, as the search area maybe further defined based on the additional information provided by the location technologies. However, an estimated location may be associated with an altitude uncertainty value and/or an altitude confidence value. In some situations, the altitude uncertainty values associated with the estimated location may indicate a significant variance between the estimated altitude of the estimated location and the altitude of the actual location of a UE, which can have significant detrimental consequences because it may obfuscate or be misinforming of the potential area in which a caller may be located, thereby making it more difficult for first responders to quickly find a distressed caller. In such a scenario, where the altitude uncertainty values are significant, providing a location report including the estimated location of a UE using the estimated location may be unnecessary and may further disrupt or mislead first responders in their efforts to find the distressed caller, as the location report may present inaccurate or unavailable information as to the potential location of the caller.

SUMMARY

The present disclosure is directed, in part, to uncertainty based altitude filtering for location reporting in E911 systems, substantially as shown in and/or described in connection with at least one of the figures, and as set forth more completely in the claims. In contrast to conventional approaches, upon transmission of a location to a cellular network, the uncertainty values associated with the location are taken into account when generating a location report. Depending on the uncertainty values, alternative location information (e.g., contents of an E911 location report) may be transmitted to a PSAP. For example, in certain embodiments, horizontal coordinates and/or vertical coordinates associated with the UE can be transmitted to a PSAP based on the altitude uncertainty values associated with a location. For example, the horizontal coordinates from the location may be included in an E911 location report along with the vertical coordinates (e.g., altitude) from the location based on the uncertainty values associated with altitude. The horizontal coordinates included in the location report may be selected based on the altitude uncertainty value. Similarly, the vertical coordinates of the location report may be included in the location report based on the altitude uncertainty value. In this way, a more accurate location report may be generated such that the potential area in which a caller may be located is reduced, making it more likely that first responders will be able to quickly locate the distressed caller.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention generate a location report in response to a communication initiated by a UE based on the altitude and/or altitude uncertainty values associated with a location associated with the UE. The systems, methods, and computer-readable media disclosed herein may provide a more accurate, concise, and specific E911 location reports to be generated for use by first responders to an emergency call. By basing the location report contents on the accuracy and/or uncertainty of location values from a UE device, only location information that is relevant and accurate may be included in the location report. For example, a UE device may provide a location with an altitude value and an associated altitude (e.g., vertical) uncertainty value indicating 5 meters. In such an example, where the location has a relatively low altitude uncertainty value, the location report may be generated such that the altitude of the location (e.g., altitude.) is included, since the altitude of the location may be more useful to emergency responders searching a particular area. As another example, a location report may be generated that includes a location with a horizontal component from a location, but without including the altitude of the location based on a relatively high altitude uncertainty value. Inclusion of the altitude value may be based on comparing the altitude uncertainty value to an uncertainty threshold. For example, if the altitude uncertainty value exceeds the uncertainty threshold, the altitude of a location may be excluded from a location report that is sent to a PSAP. In some embodiments, generating a location report that include an altitude of a location may be based on comparing the altitude value to an altitude threshold. For example, if the altitude value exceeds the altitude threshold, the altitude of a location may be excluded from a location report that is sent to a PSAP. In some embodiments, a location received in association with a UE may comprise particular uncertainty threshold values and/or altitude threshold values that may indicate that the altitude of the location should be ignored (e.g., not included in the location report). For example, the location associated with the UE may include an altitude value (e.g., vertical component) indicating 1280000 meters, or an altitude uncertainty value of 255, each indicating values that may be predetermined as threshold values. In such an example, an E911 location report may be generated without including the altitude of a location associated with the UE.

In certain aspects, E911 methods, computer-readable media, and systems are provided that take into account the altitude and altitude uncertainty value associated with a UE's estimated location. In a first aspect of the present invention, a method is provided. In embodiments, the method comprises a location received in response to an E911 communication (e.g., call, text, video, etc.) initiated by a UE. The location may include an altitude value associated with the UE. The altitude value may be compared to a threshold altitude value. Based on comparing the altitude value to the threshold altitude value, a location report may be generated that includes location information for the UE. For example, location information may be expressed in the form of geographical coordinates and/or altitude associated with the UE. An E911 location report that includes location information for the UE may then be sent to a PSAP. In this way, only relevant and therefore, more accurate location information can be provided to a PSAP, enabling first responders to locate a distressed caller faster.

In other embodiments, one or more computer-readable media having computer-executable instructions embodied thereon that, when executed, perform a method for sending an Enhanced 911 (E911) location report. The method may comprise receiving a location in response to an E911 communication initiated by a UE, wherein the location includes an altitude uncertainty corresponding to an altitude associated with the UE. The method may further comprise, comparing the altitude uncertainty to a threshold uncertainty value. The method may comprise, generating, based on comparing the altitude uncertainty to the threshold uncertainty value, an E911 location report that includes location information for the UE.

In still other embodiments, a system for generating an enhanced 911 (E911) location report comprising one or more processors configured to execute operations comprising receiving a location in response to an E911 communication initiated by a UE, wherein the first location includes an altitude and an uncertainty. For example the first location may include a horizontal uncertainty value and/or an altitude uncertainty value. The operations may further comprise determining that the altitude is less than an altitude threshold. For example, an altitude may be compared to an altitude threshold value, such as U.S. Pat. No. 1,280,000, to determine if the altitude is less than the altitude threshold. The operations may comprise determining that the uncertainty is less than an uncertainty threshold. An E911 location report may be generated based on determining that the altitude is less than the altitude threshold or that the uncertainty is less than an uncertainty threshold. In some aspects, the location report includes the altitude.

Figure 1:
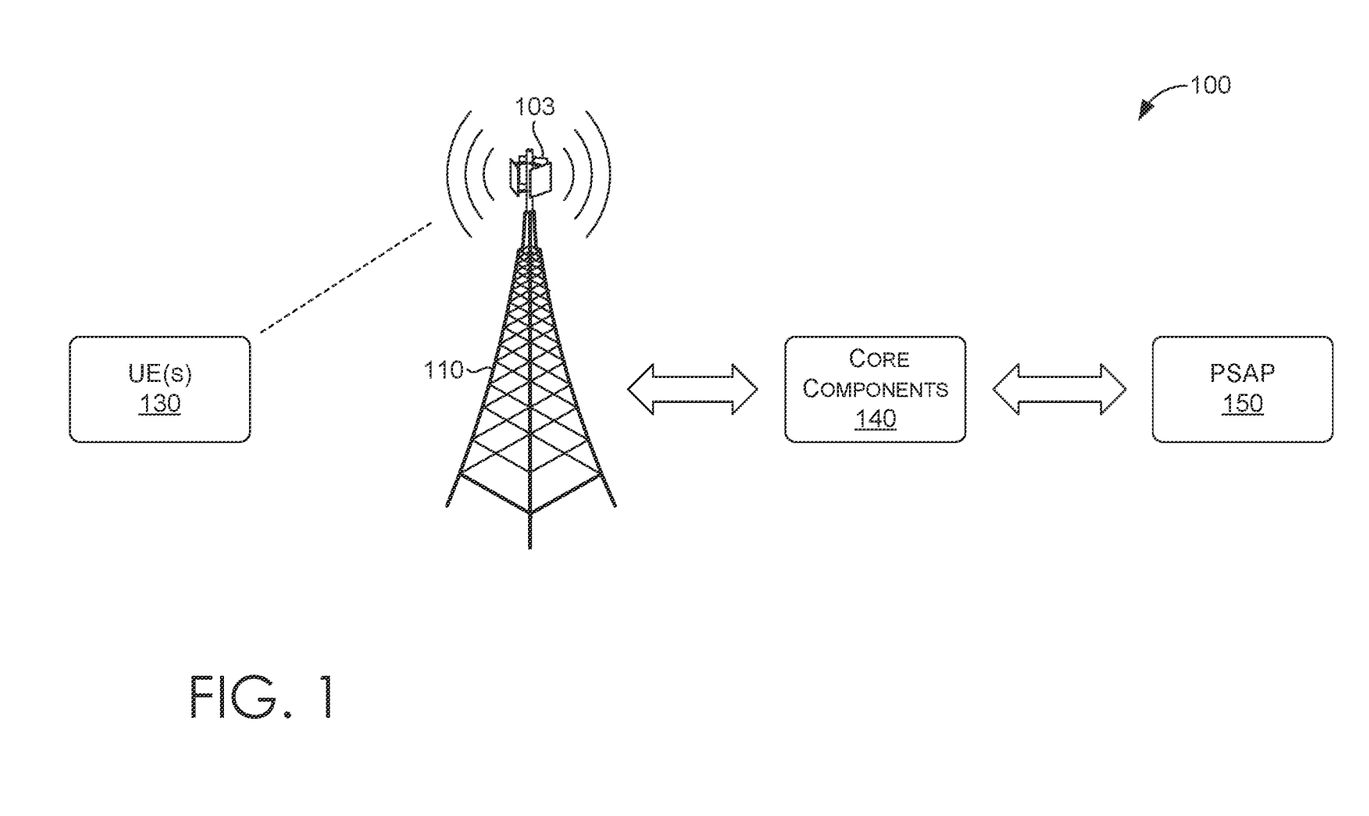
FIG. 1 depicts a diagram of an exemplary network environment in which implementations of the present disclosure may be employed.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 provides service to one or more UE(s) 130, such as E911 services. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more UE(s) 130 and other components, systems, equipment, and/or devices of the network environment 100. The base station and/or a computing device (e.g., whether local or remote) associated with the base station may manage or otherwise control the operations of components of the cell site 110. Network environment 100 may also include core components 140 one or more of which interface with cell site 110 and/or PSAP 150.

In some embodiments, one or more UE(s) 130 may take the form of one or more wireless or mobile devices capable of communication via the network environment 100. For example, one or more UE(s) 130 may take the form of one or more mobile devices capable of communication via a telecommunication network such as, but not limited to, a wireless telecommunication network. In this regard, UE(s) 130 may be any mobile computing device that communicates by way of a network, for example, a 3G, CDMA, 4G, LTE, WiMAX, 5G, 6G or any other type of network.

As used herein, user equipment (UE) (also referenced herein as a user device or UE device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 700 described herein with respect to FIG. 7.

The network environment 100 in certain embodiments may be structured to connect subscribers to a service provider or a plurality of service providers. Alternatively or additionally, the network environment 100 may be associated with a specific telecommunication provider that provides services (e.g. 5G, voice, location, etc.) to one or more UE(s) 130. For example, the user devices 130 may be subscribers to a telecommunication service provider, in which the user devices are registered or subscribed to receive voice and data services over the network environment 100. The network environment 100 may include any communication network providing voice and/or data service(s), such as, for example, a 1×circuit voice, a 3G network (e.g., CDMA, CDMA 2000, WCDMA, GSM, UMTS, a 4G network (LTE, WiMAX, HSDPA), 5G, or a 6G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
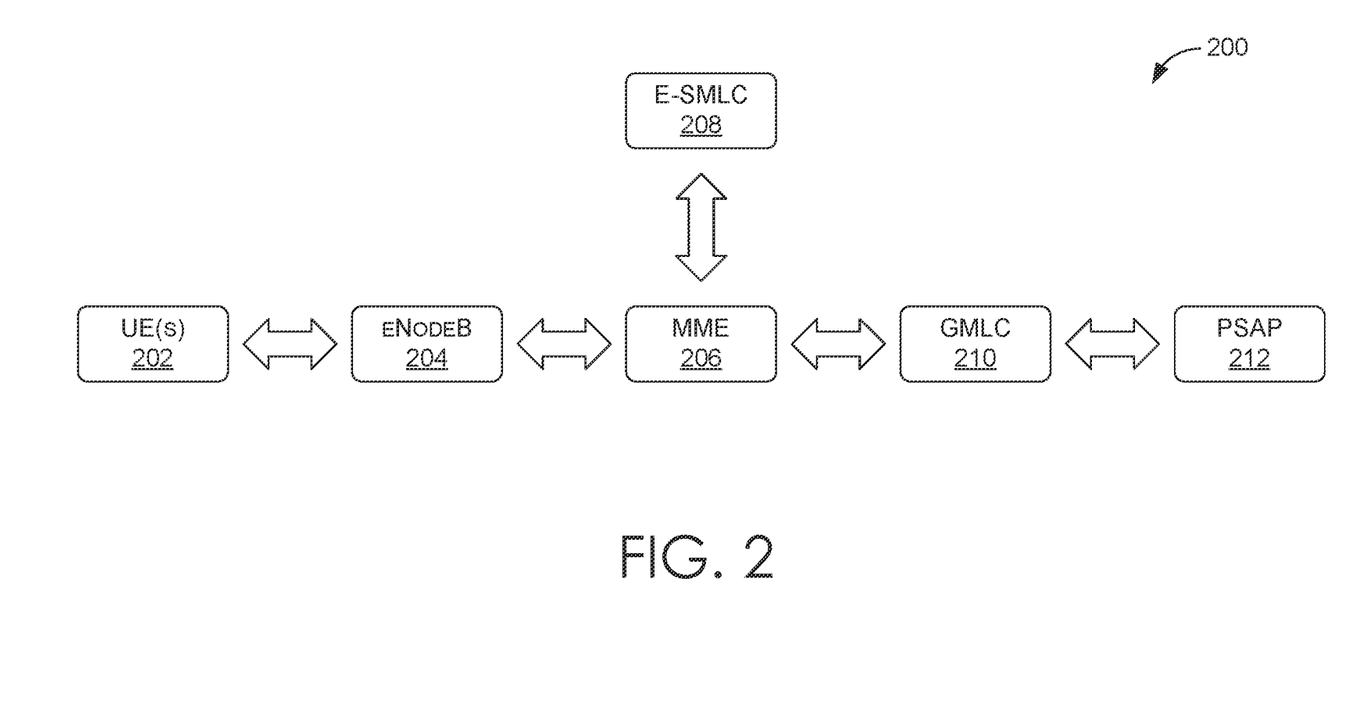
FIG. 2 depicts an example of a 4G network environment in accordance with embodiments of the present disclosure.

FIG. 2 depicts a more detailed example of network environment 100 in accordance with embodiments of the present disclosure. More particularly, FIG. 2 illustrates a 4G network environment 200 in accordance with embodiments of the present disclosure. Network environment 200 may include various 4G core components of a cellular network one or more of which may interface with PSAP 212. Network environment 200 may include one or more UE(s) 202; 4G cell site components, such as eNodeB 204; and 4G core components, such as Mobile Management Entity (MME) 206, Enhanced Serving Mobile Location Center (E-SMLC) 208, and Gateway Mobile Location Center (GMLC) 210.

Figure 3:
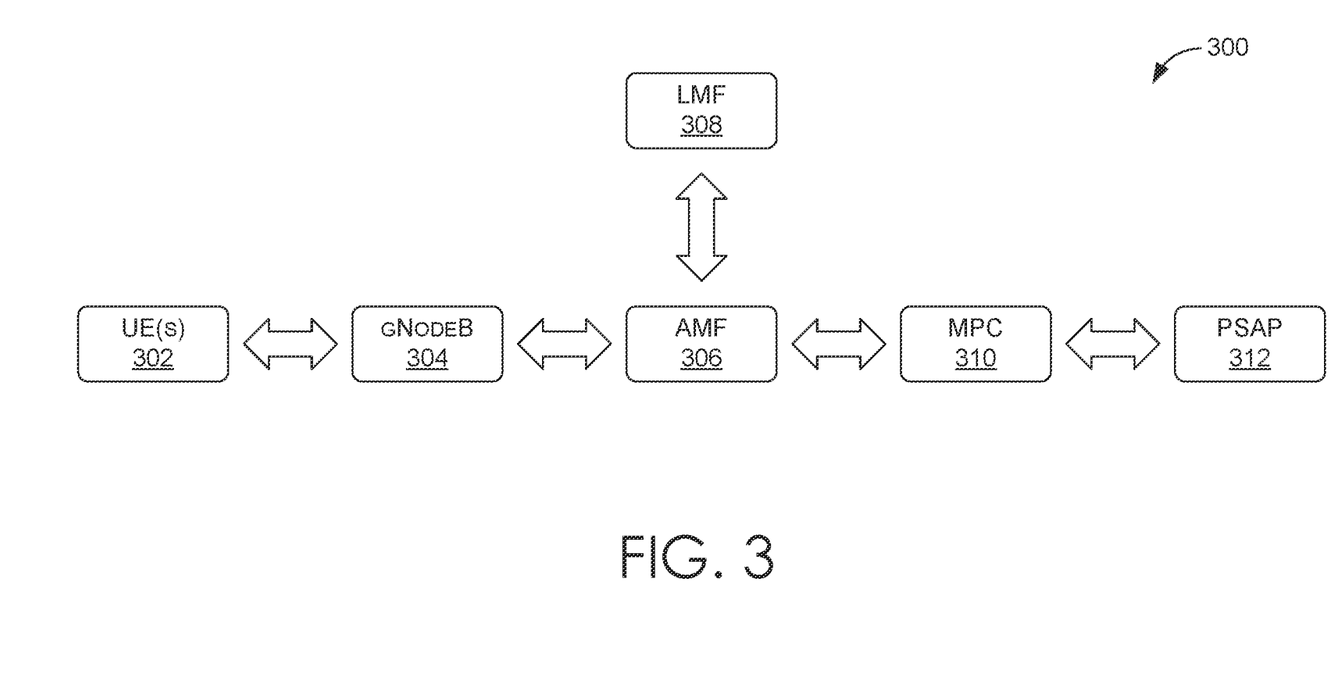
FIG. 3 depicts an example of a 5G network environment in accordance with embodiments of the present disclosure, in accordance with aspects herein.

FIG. 3 illustrates a more detailed example of network environment 100 in accordance with embodiments of the present disclosure. More particular, FIG. 3 illustrates a 5G network environment 300 in accordance with embodiments of the present disclosures. Network environment 300 may include various 5G core components of a cellular network one or more of which may interface with PSAP 312. Network environment 300 may include one or more UE(s) 302; 5G cell site components, such as gNodeB 304; and 5G core components, such as Access & Mobility Management Function (AMF) 306, Location Management Function (LMF) 308, and Mobile Positioning Center (MPC) 310.

Figure 4:
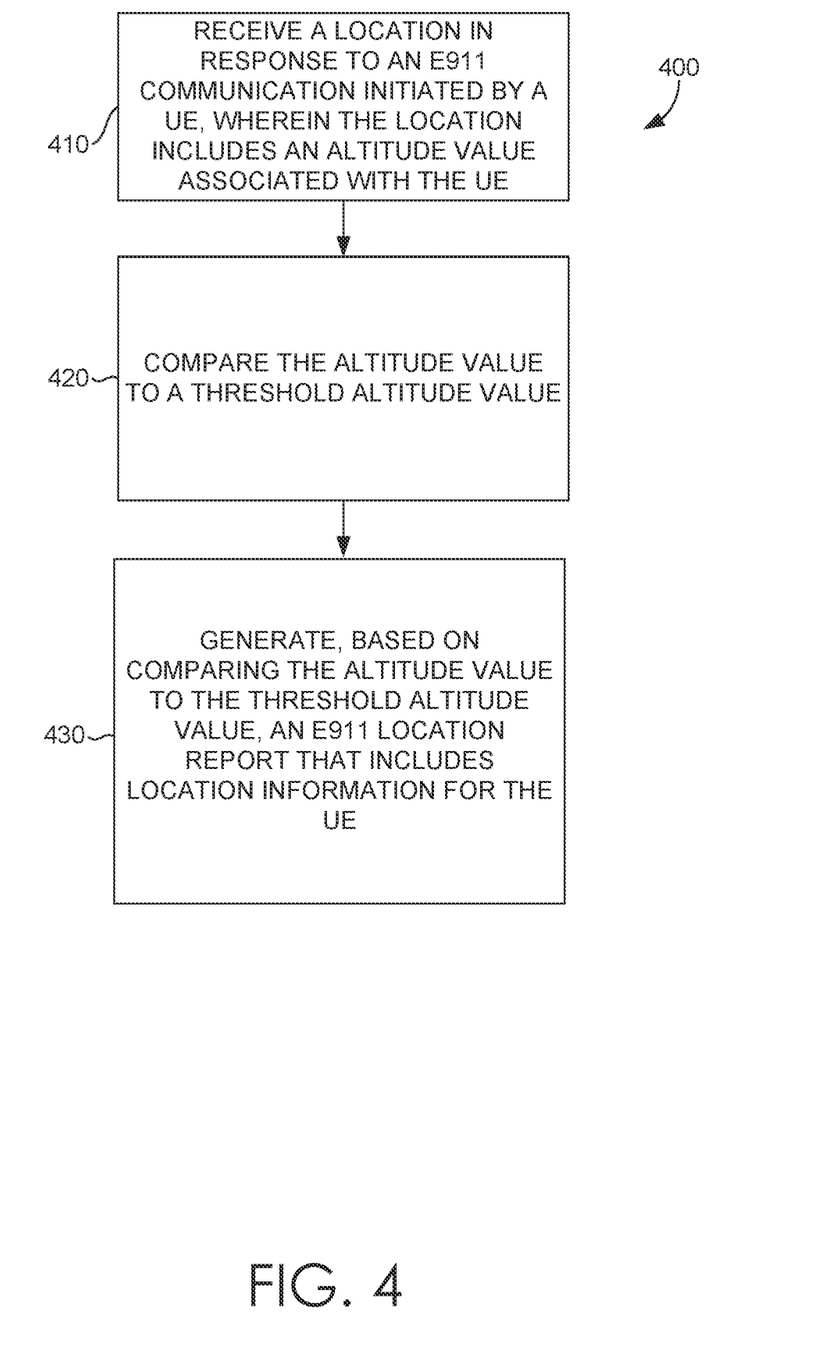
FIG. 4 depicts a flow chart of a method for uncertainty based altitude filtering for location reporting in E911 systems, in accordance with aspects of the present disclosure.

FIG. 4 is a flow chart illustrating an example method 400 for uncertainty based altitude filtering for location reporting in E911 systems. It should be understood that while FIG. 4 depicts just one particular arrangement and/or order of steps, other arrangements and/or orders of steps are possible and contemplated by the disclosed herein. For instance, one or more of the steps depicted in FIG. 4, may be performed in a different order or otherwise omitted.

At step 410 of the method 400, a location may be received in response to an E911 communication initiated by a UE, such as UE(s) 130 of FIG. 1. For example, when a UE user places an emergency call and/or text message, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location to the E-SMLC in the case of the 4G implementation and the LMF in the case of the 5G implementation via the MME in the case of the 4G implementation and the AMF in the case of the 5G implementation. The location for the UE may be derived from a mix of location methods including crowdsourced WiFi, Assisted Global Navigation Satellite System (A-GNSS), and UE-based sensors. For example the location information may be based on DBH technologies or A-GPS technologies. In addition, the location for the UE may include an associated uncertainty estimate reflective of the quality of the estimated location of the UE. For example, the location may include a horizontal uncertainty corresponding to a horizontal component of the location and/or an altitude uncertainty corresponding to a vertical component of the location. As another example, the location may include a horizontal uncertainty value indicative of uncertainty in the horizontal footprint and/or an altitude uncertainty indicative of uncertainty in an altitude measurement of the location.

At step 420 of method 400, the altitude value is compared to a threshold altitude value. In some embodiments, the altitude value is included in the location received in step 410. Comparing the altitude value to the threshold altitude value may involve determining that the altitude value is greater than, less than, equal to, or any combination of comparative properties, with respect to the threshold altitude value. For example, the altitude value may be compared to the threshold altitude value to determine that the altitude value is less than the threshold altitude value.

At step 430 of the method 400, an E911 location report is generated based on comparing the altitude value to the threshold altitude value. In some embodiments, the location report may include some portion of location information associated with the UE device. For example, if the altitude value from the UE is less than the threshold altitude value, the altitude value may be included in a location report. In further examples, the threshold altitude value may be predetermined to be any desired value. For instance, the threshold altitude value may be determined to be 1280000. In such an instance, if altitude value from a UE is less than 1280000, the altitude value may be included in a location report. In some embodiments, the altitude threshold value may be chosen to be a maximum possible value for a particular altitude measurement. For example, if the maximum possible altitude value is 1280000, 1280000 may be chosen as the threshold altitude value. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE. The GMLC in the case of a 4G implementation and the MPC in the case of the 5G implementation may then then send this location report to PSAP. The location report may include information associated with UE(s) 130 of FIG. 1. In certain aspects the location information for the UE comprises a horizontal and/or vertical coordinates such as latitude/longitude and altitude respectively.

Figure 5:
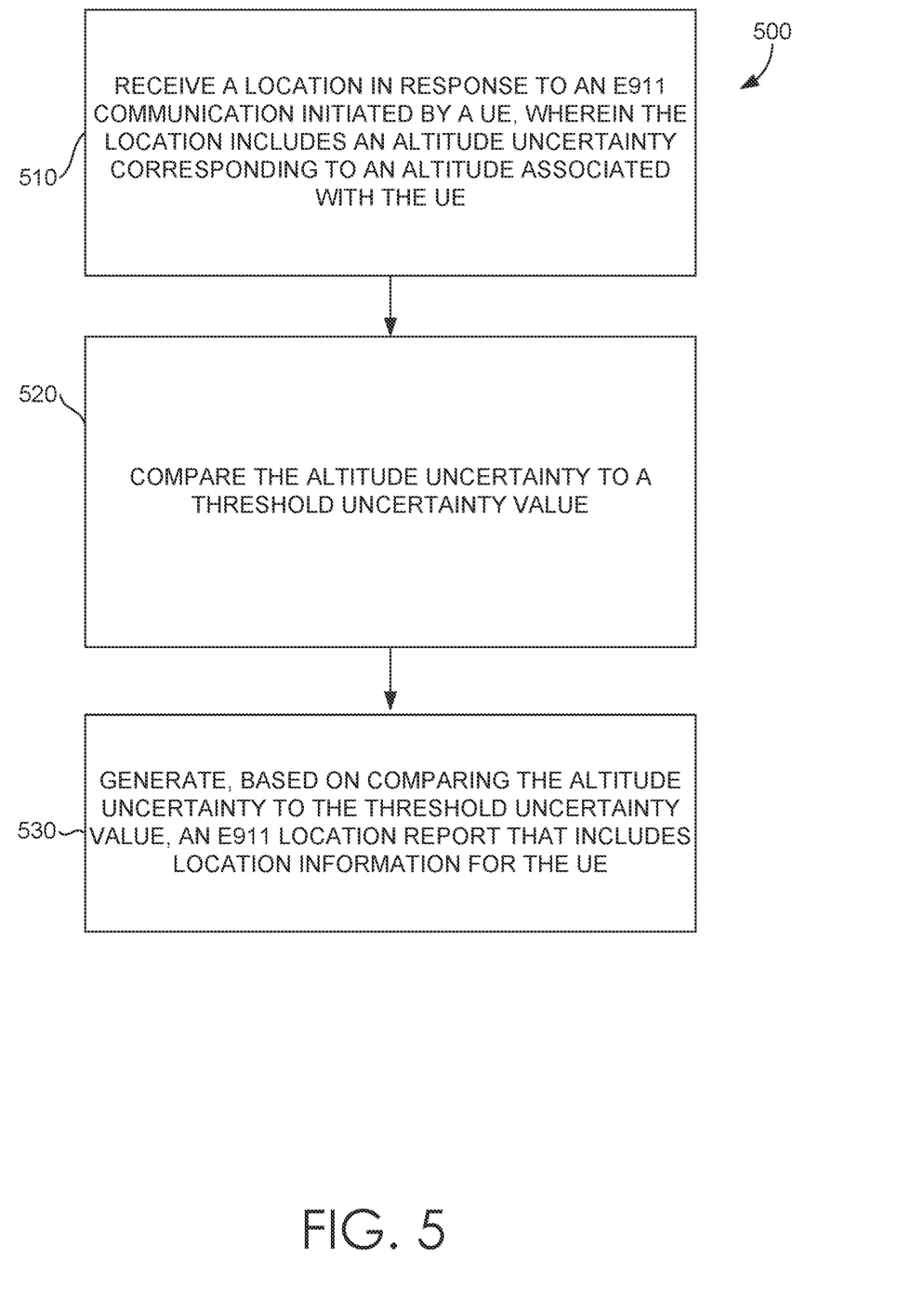
FIG. 5 depicts a flow chart of a method for uncertainty based altitude filtering for location reporting in E911 systems, in accordance with aspects of the present disclosure.

FIG. 5 is a flow chart illustrating an example method 600 for uncertainty based altitude filtering for location reporting in E911 systems. It should be understood that while FIG. 5 depicts just one particular arrangement and/or order of steps, other arrangements and/or orders of steps are possible and contemplated by the disclosed herein. For instance, one or more of the steps depicted in FIG. 5, may be performed in a different order or otherwise omitted.

In step 510 of method 500, a location may be received in response to an E911 communication initiated by a UE, such as UE(s) 130 of FIG. 1. For example, when a UE user places an emergency call. In response to the communication, the UE may provide the location that may be derived from a mix of location methods. For example the location may be derived from a DBH location or an A-GPS location. In some embodiments, the location may include an altitude uncertainty that corresponds to an altitude measurement associated with the UE. In some embodiments, the location may comprise a horizontal component of the location and/or an altitude component of the location. For example, the location may include longitude and latitude coordinates associated with a location as the horizontal component of the location. In some examples, the location may include an altitude value associated with a location as a vertical component of the location.

In step 520 of method 500, the altitude uncertainty is compared to a threshold uncertainty value. In some embodiments, the altitude uncertainty is included in the location received in step 510. Comparing the altitude uncertainty to the threshold uncertainty value may involve determining that the altitude uncertainty is greater than, less than, equal to, or any combination of comparative properties, with respect to the threshold uncertainty value. For example, the altitude uncertainty may be compared to the threshold uncertainty value to determine that the altitude uncertainty is less than the threshold uncertainty value.

At step 530 of method 500, an E911 location report is generated based on comparing the altitude uncertainty to the threshold uncertainty value. In some embodiments, the location report may include some portion of location information associated with the UE device. For example, if the altitude uncertainty received from a UE is less than the threshold uncertainty value, an altitude value may be included in a location report. In further examples, the threshold uncertainty value may be predetermined to be any desired value. For instance, the threshold uncertainty value may be determined to be 255. In such an instance, if uncertainty value from a UE is less than 255, an altitude value may be included in a location report. In some embodiments, the threshold uncertainty value may be chosen to be a maximum possible value for a particular uncertainty measurement. For example, if the maximum possible uncertainty value is 255, 255 may be chosen as the threshold uncertainty value. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE. The GMLC in the case of a 4G implementation and the MPC in the case of the 5G implementation may then then send this location report to PSAP. The location report may include information associated with UE(s) 130 of FIG. 1. In certain aspects the location information for the UE comprises a horizontal and/or vertical coordinates such as latitude/longitude and altitude respectively.

Figure 6:
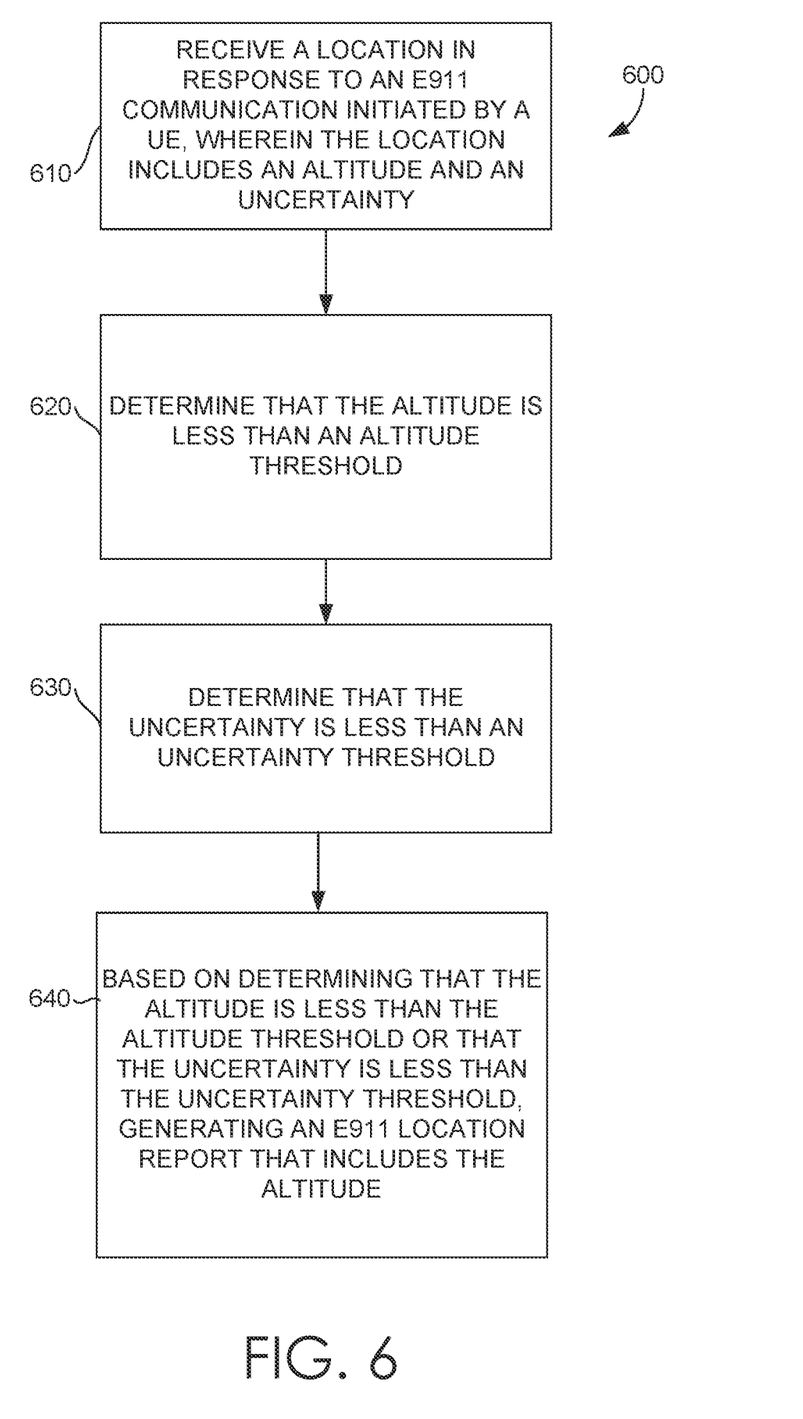
FIG. 6 depicts a flow chart of a method for uncertainty based altitude filtering for location reporting in E911 systems, in accordance with aspects of the present disclosure.

FIG. 6 is a flow chart illustrating an example method 600 for uncertainty based altitude filtering for location reporting in E911 systems. It should be understood that while FIG. 6 depicts just one particular arrangement and/or order of steps, other arrangements and/or orders of steps are possible and contemplated by the disclosed herein. For instance, one or more of the steps depicted in FIG. 6, may be performed in a different order or otherwise omitted.

At step 610 of the method 600, a first location may be received in response to an E911 communication initiated by a UE, such as UE(s) 130 of FIG. 1. For example, when a UE user places an emergency call and/or text message, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location to the E-SMLC in the case of the 4G implementation and the LMF in the case of the 5G implementation via the MME in the case of the 4G implementation and the AMF in the case of the 5G implementation. For example, the UE may provide a location that includes a horizontal component and/or an altitude component. In some embodiments, the location may include an uncertainty value. For example, the first location may include a horizontal uncertainty corresponding to a horizontal component of the location and/or an altitude uncertainty corresponding to a vertical component of the location.

At step 620 of the method 600, it is determined that the altitude is less than an altitude threshold. In some embodiments, the altitude is included in the location received in step 610. Determining that the altitude is less than the altitude threshold may involve comparing the altitude to the altitude threshold. The altitude threshold may be predetermined to be any suitable value. For example, the altitude threshold may be selected to be 1280000. In such an example, an altitude of 1279999 associated with a UE, would be determined to be less than the altitude threshold.

At step 630 of method 600, it is determined that the uncertainty is less than an uncertainty threshold. In some embodiments, the uncertainty may be included in the location received in step 610. Determining that the uncertainty is less than the uncertainty threshold may involve comparing the uncertainty to the uncertainty threshold. The uncertainty threshold may be predetermined to be any suitable value. For example, the uncertainty threshold may be selected to be 255. In such an example, an uncertainty value of 254 associated with a UE, would be determined to be less than the uncertainty threshold.

At step 640 of the method 600, an E911 location report is generated based on determining that the altitude is less than the altitude threshold or determining that the uncertainty is less than the uncertainty threshold. In some embodiments, the location report may include the location received from the UE. For example, if the uncertainty associated with the location from the UE is determined to be lower that the uncertainty threshold, the altitude included in the location provided by the UE may be included in a location report. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE such as altitude. The GMLC in the case of a 4G implementation and the MPC in the case of the 5G implementation may then then send this location report to PSAP. The location report may include information associated with UE(s) 130 of FIG. 1. In some embodiments, the contents of the location report may be based on a DBH location or an A-GPS location received from a UE device. For example, the location report may include the altitude component of a DBH location or an altitude component of an A-GPS location. In other examples, the location report may include the horizontal component of both a DBH location and an A-GPS location. The location report having any combination of the various components or parameters of a location is contemplated herein.

Figure 7:
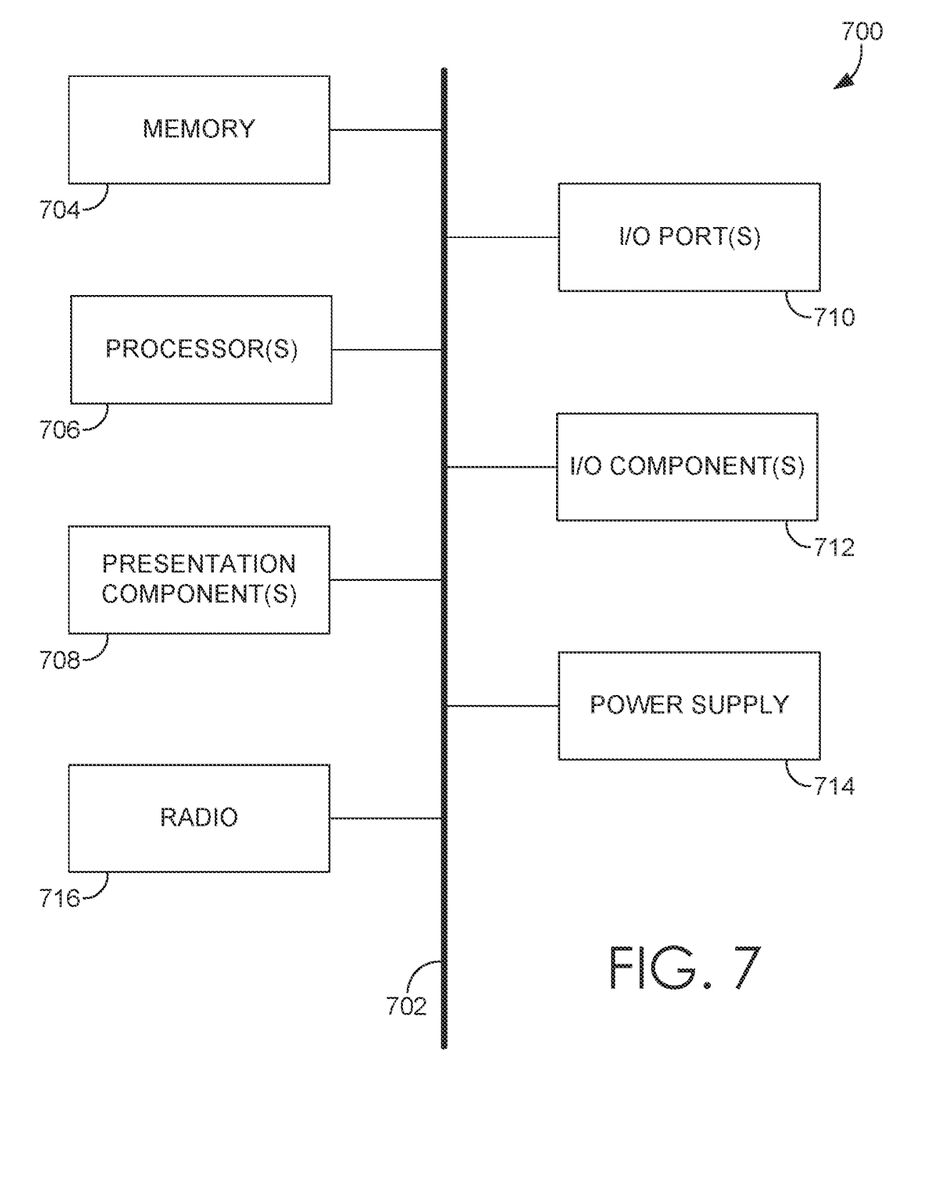
FIG. 7 depicts a diagram of an exemplary computing environment suitable for use in implementations of the present disclosure.

Referring now to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, power supply 714 and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component, such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Exemplary memory includes solid-state memory, hard drives, optical-disc drives, etc. Computing device 700 includes one or more processors 706 that read data from various entities, such as bus 702, memory 704, or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices, including I/O components 712, some of which may be built in computing device 700. Illustrative I/O components 712 include a microphone, joystick, game pad, satellite dish, scanner, printer, wireless device, etc.

Radio 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. An Enhanced 911 (E911) method, the method comprising:
    receiving a location in response to an E911 communication initiated by a UE, wherein the location includes an altitude value associated with the UE;
    comparing the altitude value to a threshold altitude value;
    determining that the altitude value is above the threshold altitude value; and
    based on determining that the altitude value is above the threshold altitude value, generating an E911 location report that excludes the altitude value.

2. The method of claim 1, wherein the threshold altitude value is 1280000 meters.

3. The method of claim 1, further comprising, sending the E911 location report to a Public Safety Answering Point (PSAP).

4. The method of claim 1, wherein the location is an assisted global positioning system (A-GPS) location or a device-based hybrid (DBH) location associated with the UE.

5. The method of claim 1, wherein the E911 location report includes an indication of an uncertainty value associated with the location.

6. The method of claim 1, wherein generating the E911 location report is further based on comparing an altitude uncertainty to a threshold uncertainty value.

7. The method of claim 1, wherein the location is determined based on crowd-sourced WiFi.

8. The method of claim 1, further comprising transmitting the E911 location report to a Gateway Mobile Location Center.

9. One or more non-transitory computer-readable media having computer-executable instructions embodied thereon that, when executed, perform a method for sending an Enhanced 911 (E911) location report, the method comprising:
    receiving a location in response to an E911 communication initiated by a UE, wherein the location includes an altitude uncertainty corresponding to an altitude value associated with the UE;
    comparing the altitude uncertainty to a threshold uncertainty value;
    determining that the altitude value is above a threshold altitude value;
    determining the altitude uncertainty is above the threshold uncertainty value; and
    generating, based on determining the altitude uncertainty is above the threshold uncertainty value and determining that the altitude value is above the threshold altitude value, an E911 location report that excludes the altitude.

10. The one or more non-transitory computer-readable media of claim 9, wherein the E911 location report includes a latitude of the location.

11. The one or more non-transitory computer-readable media of claim 9, wherein the threshold uncertainty value is 255 meters.

12. The one or more non-transitory computer-readable media of claim 9, wherein the location is an assisted global positioning system (A-GPS) location or a device-based hybrid (DBH) location associated with the UE.

13. The one or more non-transitory computer-readable media of claim 9, further comprising, sending the E911 location report to a Public Safety Answering Point (PSAP).

14. The one or more non-transitory computer-readable media of claim 9, wherein the E911 location report includes an indication of the altitude uncertainty.

15. The one or more non-transitory computer-readable media of claim 9, further comprising transmitting the E911 location report to a Mobile Positioning Center.

16. A system for generating an enhanced 911 (E911) location report, the system comprising one or more processors configured to execute operations comprising:
    receiving a location in response to an E911 communication initiated by a UE, wherein the location includes an altitude value and an uncertainty;
    determining that the altitude value is, greater than an altitude threshold value;
    determining that the uncertainty is above an uncertainty threshold; and
    based on determining that the altitude value is greater than the altitude threshold value and that the uncertainty is above the uncertainty threshold, generating an E911 location report that excludes the altitude value.

17. The system of claim 16, wherein the location comprises a device-based hybrid (DBH) location or an assisted global positioning system (A-GPS) location.

18. The system of claim 16, wherein the altitude threshold value is 1280000 meters or the uncertainty threshold is 255 meters.

19. The system of claim 16, wherein the E911 location report includes an indication of the uncertainty.

20. The system of claim 16, further comprising, sending the E911 location report to a Public Safety Answering Point (PSAP).

* * * * *